United States Patent
Curtis et al.

(12) 
(10) Patent No.: US 6,507,948 B1
(45) Date of Patent: Jan. 14, 2003

(54) METHOD, SYSTEM, AND PROGRAM FOR GENERATING BATCH FILES

(75) Inventors: Bryce Allen Curtis, Round Rock, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,195

(22) Filed: Sep. 2, 1999

(51) Int. Cl.[7] .............................................. G06F 9/445
(52) U.S. Cl. ..................................................... 717/174
(58) Field of Search .......................... 717/11, 168–178; 713/1, 2, 10; 707/203; 709/221–222

(56) References Cited

U.S. PATENT DOCUMENTS

| | | | | |
|---|---|---|---|---|
| 5,247,683 A | * | 9/1993 | Holmes et al. | 395/700 |
| 5,317,722 A | * | 5/1994 | Evans | 395/500 |
| 6,094,531 A | * | 7/2000 | Allison et al. | 395/712 |
| 6,269,480 B1 | * | 7/2001 | Curtis | 717/11 |
| 6,289,512 B1 | * | 9/2001 | Edwards et al. | 717/11 |

OTHER PUBLICATIONS

Indigo Rose Software Design Corp. "Setup Factory 4.0" User's Guide, 1998.

\* cited by examiner

*Primary Examiner*—Gregory Morse
*Assistant Examiner*—Wei Zhen
(74) *Attorney, Agent, or Firm*—David W. Victor; Konrad Raynes Victor & Mann LLP

(57) ABSTRACT

Disclosed is a system, method, and program for creating a file, such as a batch file, that is capable of executing on one of many different operating systems. An object is processed including a plurality of instructions. Each instruction is associated with at least one executable function. A determination is made of an operating system in which the generated file will be executed. For each instruction in the object, a native operating system command is generated that is capable of executing the function associated with the instruction on the determined operating system. Each generated native operating system command is inserted into the file. Execution of the file on the determined operating system will execute the native operating system commands in the file to perform the functions associated with the instructions included in the object.

33 Claims, 3 Drawing Sheets

METHOD, SYSTEM, AND PROGRAM FOR GENERATING BATCH FILES

CROSS-REFERENCE TO RELATED APPLICATIONS

This application is related to the following co-pending and commonly-assigned patent applications, which applications were all filed on Mar. 29, 1999, and which applications are incorporated herein by reference in their entirety:

"A Cross-Platform Program, System, and Method Having a Global Registry Object for Mapping Registry Equivalent Functions in an AIX Operating System Environment," having Ser. No. 09/280,345;

"A Cross-Platform Program, System, and Method Having a Global Registry Object for Mapping Registry Equivalent Functions in an OS/2 Operating System Environment," having Ser. No. 09/280,350;

"A Cross-Platform Program, System, and Method Having a Global Registry Object for Mapping Registry Functions in a Windows Operating System Environment," having Ser. No. 09/280,349;

"Global Registry Object for Mapping Registry Functions and Registry Equivalent Functions Across Multiple Operating Systems in a Cross-platform Program," having Ser. No. 280,371;

"A Cross-platform Program, System, and Method Having a System Independent Registry for Use on Operating Systems Irrespective of a Registry Equivalent," having Ser. No. 09/280,368;

"A System, Method, and Program for Enabling a Use of Property Object Having a Variable for a Property Value in a Cross-Platform Program," having Ser. No. 09/280,344;

"A System, Method, and Program for Overriding Program Properties," having Ser. No. 09/280,346;

"A System, Method and Program for Providing an Object-Oriented Install Architecture," having Ser. No. 09/280,352;

"A System, Method, and Program for Automatic Error Detection While Utilizing a Software State Machine for Carrying out the Process Flow of a Software Program," having Ser. No. 09/280,375;

"A System, Method, and Program for Utilizing a Software State Machine for Carrying Out the Process Flow of a Software Program," having Ser. No. 09/280,376;

"A System, Method, and Program for Enabling a Software Program to Automatically Select a System-dependent Function," having Ser. No. 09/280,369;

"A System, Method, and Program for Mapping a Global Object to Desktop Elements of Different Operating Systems," having Ser. No. 09/280,372;

"A System, Method, And Program For Processing Dependencies Using a Dependency Object," having Ser. No. 09/280,370;

"A System, Method, and Program for Modifying a Text File," having Ser. No. 09/280,348;

"A System, Method, and Program for Updating Registry Objects With a Cross-platform Installation Program," having Ser. No. 09/280,351;

"A System, Method, and Program For Preserving Background Settings During Install and Uninstall Operations," having Ser. No. 09/280,374;

"A System, Method, And Program for Modifying a Library Object," having Ser. No. 09/280,347;

"A System, Method, And Program For Installation on Drives Using a Drive Object," having Ser. No. 09/280,353;

"A System, Method, and Program for Performing Program Specific Uninstall Operations," having Ser. No. 09/280,373.

BACKGROUND OF THE INVENTION

1. Field of the Invention

The present invention relates to a method, system, and program for generating batch files and, in particular for generating batch files during installation and uninstallation of programs.

2. Description of the Related Art

A batch file or script file is a file that contains a sequence or batch of commands. Batch files are useful for storing sets of commands that are always executed together because the sequence of commands are executed by a single call to the batch file name, instead of entering each command individually. In DOS systems, batch files end with a .BAT extension. Many operating systems use the terms command file or shell script to refer to a batch file. Any valid operating system command may be included in the batch file.

An installation program executing in a particular operating system environment would include a routine to modify or build batch files for use by the installed program set. For installation programs that are designed to install the same program on different operating systems, the installation program developer would have to include in each operating specific installation program a separate operating system specific routine to build or modify batch or script files using the operating system commands. Thus, the installation program developer would have to separately program the installation program to create batch files for each operating system. This process can be significantly tedious if the installation program developer has to write a routine in each operating system specific installation program to build the operating system specific batch files.

There is thus a need in the art for an improved method, system, and program for building batch files to include in an installation program.

SUMMARY OF THE PREFERRED EMBODIMENTS

To overcome the limitations in the prior art described above, preferred embodiments disclose a system, method, and program for generating a file. An object is processed including a plurality of instructions. Each instruction is associated with at least one executable function. A determination is made of an operating system in which the generated file will be executed. For each instruction in the object, a native operating system command is generated that is capable of executing the function associated with the instruction on the determined operating system. Each generated native operating system command is inserted into the file. Execution of the file on the determined operating system will execute the native operating system commands in the file to perform the functions associated with the instructions included in the object.

In further embodiments, a property associated with the object is processed indicating whether to execute the file after generating the file. The file is executed after being generated if the property indicates to execute the file after being generated. The file is stored in non-volatile memory. Alternatively, the file can be deleted after execution.

In still further embodiments, the file is generated during an installation of a program to include native operating system commands to configure the system for the program being installed. In such case, the file is executed to configure the system to support the program being installed.

In yet further embodiments, a method, system, and program is provided to configure a system during uninstallation of a program to remove files and changes added when the program was uninstalled. During uninstallation, an uninstall object including a plurality of instructions is processed. Each instruction is associated with at least one executable function. A determination is made of an operating system in which the executable functions described in the uninstall object will be executed. For each instruction in the object, a native operating system command is generated that is capable of executing the function associated with the instruction in the determined operating system. Each generated native operating system command is then inserted into a file. The file and native operating system commands therein are then executed to configure the system to reverse changes to the system resulting from the installation of the program.

Preferred embodiments provide a class of data objects and methods which may be used to generate a batch file for processing during installation, uninstallation or other operations. A object would be created defining the sequence of operations to perform in a file generated from the object. The operations specified in the object would be automatically converted to native operating system commands to perform the operations specified in the object. These native operating system commands would then be written to a file that may be stored in the system or used only once during install or uninstall and then deleted.

With preferred embodiments, an installation program developer need only write the batch file once in a preferred embodiment object, and then have the preferred logic automatically generate a file including native operating system commands specified in the data object. In this way, batch files defined once using one set of commands can be used to generate the batch files on different operating systems. Preferred embodiments provide a cross-platform program for installing batch files for use during installation, uninstallation or for other reasons.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
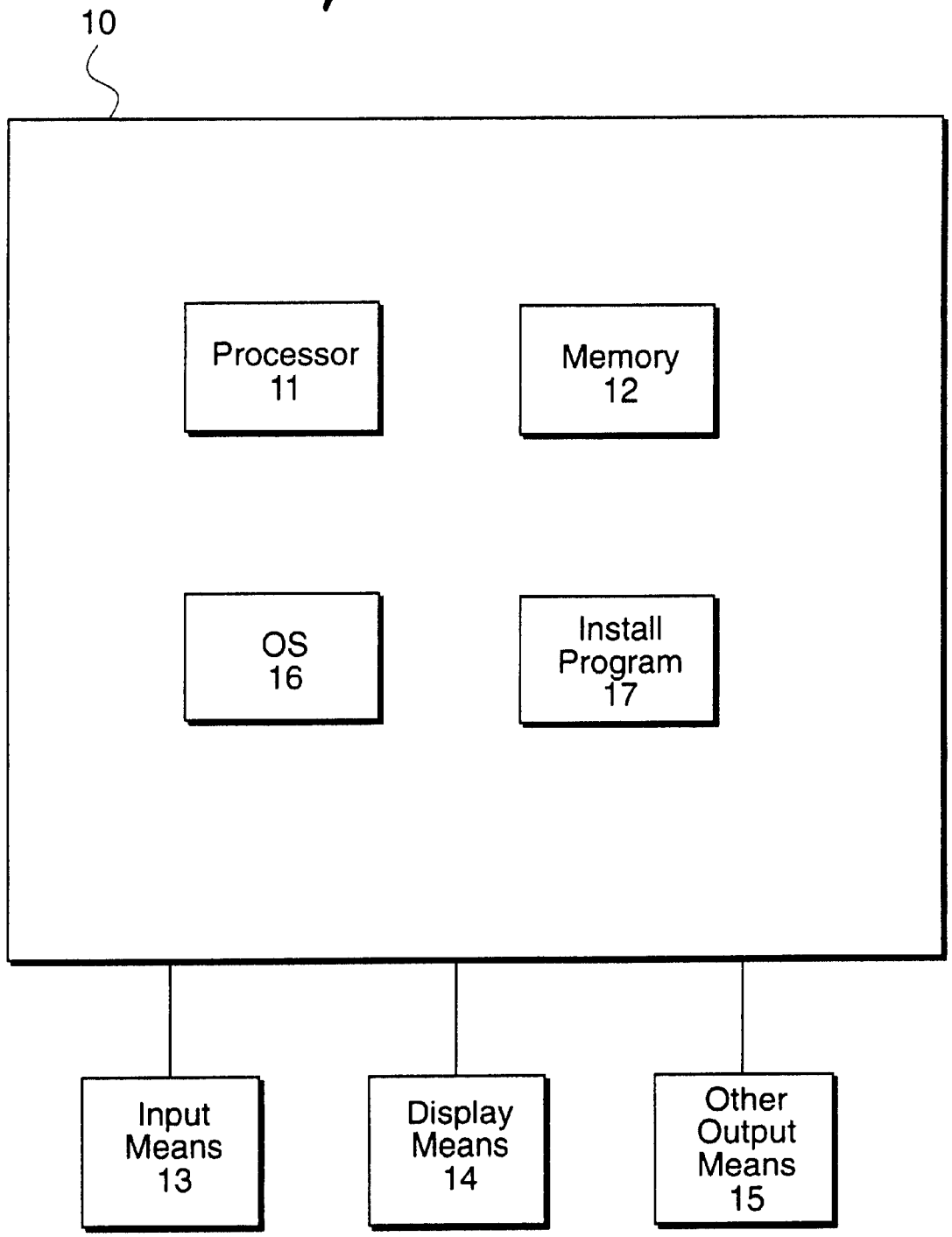
FIG. 1 is a block diagram illustrating a computing environment in which preferred embodiments of the present invention are implemented.

FIG. 1 depicts a block diagram of a data processing system 10, i.e., computer system, in which a preferred embodiment of the present invention may be implemented. The computer includes a processor 11 and memory 12. The computer 10 may be, but is not limited to, a personal computer, workstation, or a mainframe. The computer system also includes input means 13 such as a keyboard, mouse, track ball, light pen, pen-stylus, voice input system, touch-sensitive device, and/or any other input means known in the art. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 include an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Installer Program

Figure 2:
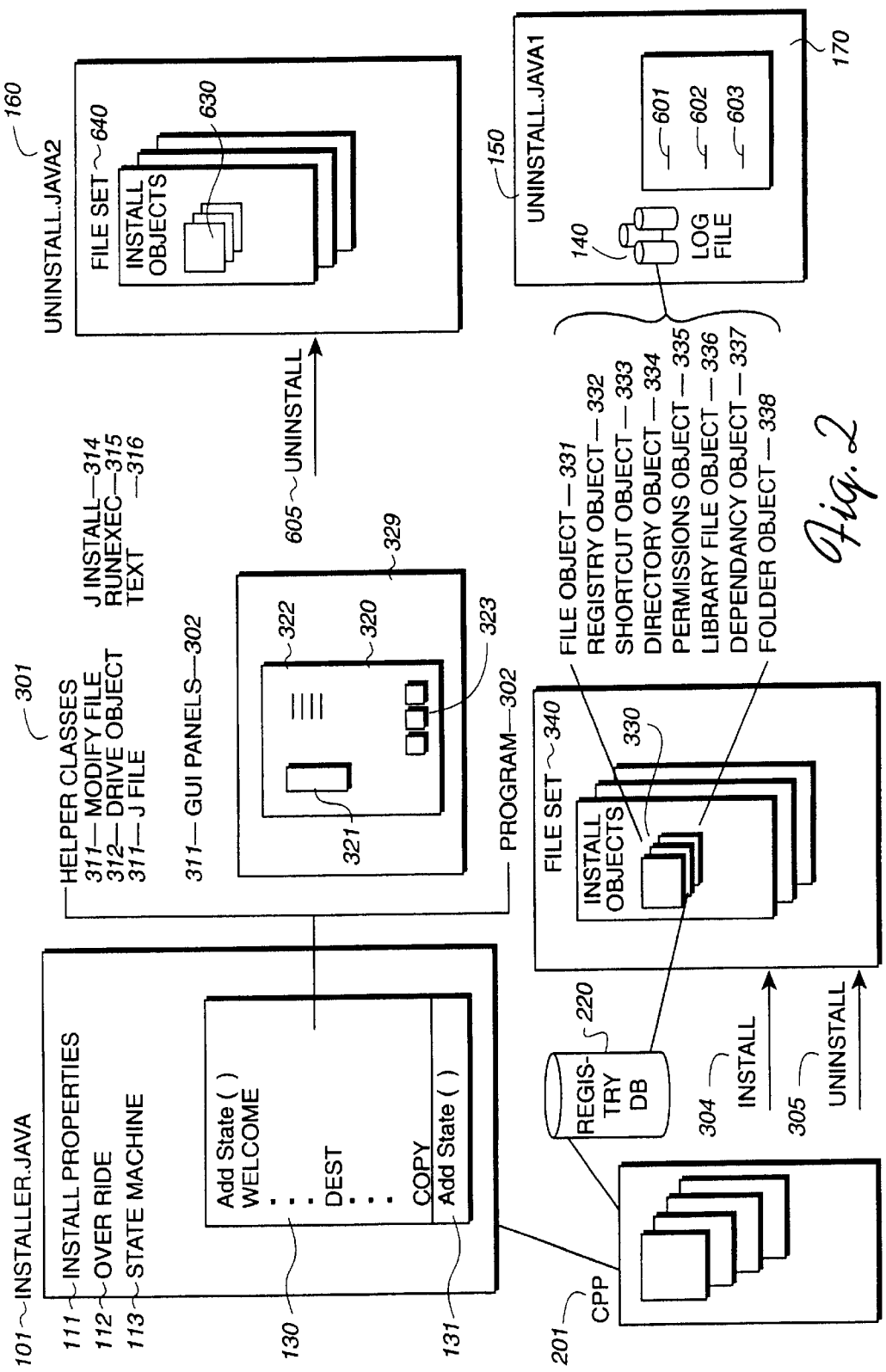
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. The term "file set" as used herein refers to any data, program components, help files, and/or data files, that comprise the program. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Javal" 150 which implements a "base uninstall" class, which includes several methods that get called at different points during uninstall. During install, the log 140 and "uninstall.Javal" 150 information are built. The log file 140 and "uninstall.Javal" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Logs are used for both the install and uninstall process. Furthermore, these logs are human readable which allows them to be checked, e.g., after a silent install, to ensure that a file has installed successfully. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

The installer tool kit of the preferred embodiment of this invention supports the Windows 32 operating systems including Windows 95, Windows 98 and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

Cross-Platform Batch File Builder

Preferred embodiments provide a set of object oriented tools to allow the installation program developer to build a Java object, referred to as the ScriptObject, that specifies certain properties and methods to generate a batch file during installation or delete a batch file during uninstallation. The term "batch file" as used herein refers to any files containing a sequence of commands grouped together for execution, including script files, batch files, etc. With the ScriptObject of the preferred embodiments, the installation program developer need only design a single ScriptObject which is then used to install batch files across different operating systems. Preferred embodiments provide numerous methods and properties the installation program developer may include in the ScriptObject that specify how batch files are generated and processed during installation and uninstallation.

The following properties may be included in a ScriptObject to set the properties of the batch file generated from the ScriptObject:

so.setOwner(string): the "string" indicates a user ID of the owner of the batch file generated from the ScriptObject. The owner can set the levels of permissions for different groups of users, who may read, write (modify), or execute the batch file.

so.setPermissions(string): the "string" indicates the access to the batch file generated from the ScriptObject permitted to different users, i.e., whether a user can read, write or execute the batch file. Only the owner can set permissions.

so.setExecuteDuringInstall(boolean): a parameter value of true indicates that the batch file defined by the ScriptObject is executed during installation.

so.setExecuteDuringUninstall(boolean): a parameter value of true indicates that the batch file defined by the ScriptObject is executed during uninstallation.

Preferred embodiments provide numerous different actions or methods that perform functions typically included in batch files. The installation developer may include any number of the below methods in the ScriptObject to define the sequence of commands in the batch file generated from the ScriptObject. When generating the batch file, the native operating system commands corresponding to the methods are used to carry out the functions specified by the methods. Below are some methods that may be included in the ScriptObject and used to generate the native operating system commands into the batch file.

so.createDirectory(string): used to create a directory in the file system having the name "string" parameter so.changeDirectory(string): changes to the directory specified in the "string" parameter.

so.deleteDirectory(striny): deletes the directory specified in the "string" parameter.

so.renameDirectory(string 1, string 2): renames the directory specified in the "string 1" parameter to the name specified in the "string 2" parameter.

so.deleteFile(string: deletes the file specified in the "string" parameter. so.renameFile(string 1, string 2): renames the file specified in the "string 1" parameter to the name specified in the "string 2" parameter, so.copyFile(string 1, string 2): copies the file specified in the "string 1" parameter to the file specified in the "string 2" parameter.

so.moveFile(string 1, string 2): moves the file specified in the "string 1" parameter to the file specified in the "string 2" parameter.

so.setFileOwner(string file, string owner): assigns ownership of the file specified in the parameter "string file" to the user id specified in the parameter "string owner."

so.setFilePermisions(string file, string permissions): sets the permissions defining the level of access indicated in the parameter "string permissions" for the file specified in the parameter "string file."

so.runProgram(string progname, string args): executes the program specified in the parameter "string progname" and passes to the program the parameters specified in the parameter "string args." This method allows execution of an external program from within a batch file.

so.runScript(string script name, string args): executes the script or batch file specified in the parameter "string progname" and passes to the batch file the parameters specified in the parameter "string args." This method allows a call to execute an external batch file.

so.setVariable(string varname, string value: sets the variable specified in the parameter "vamame" to the value specified in the parameter "string value."

so.setPath(string value): sets the path environment variable to the parameter "string value." The path indicates a path of directories the operating system searches for executable files the operating system cannot find in the working directory.

so.appendPath(string value): appends the string specified in the parameter "string value" to the end of the current path value.

so.prepend(string value): appends the string specified in the parameter "string value" to the front of of the current path value.

so.setClassPath(string value)—sets the Java ClassPath to the string specified in the parameter "string value." A Java classpath is an environment variable specifing the file directory of where to find all members of a class.

so.appendClasspath(string value): appends the string specified in the parameter "string value" to the end of the current class path environment variable.

so.prerend(string value): appends the string specified in the parameter "string value" to the end of the current path value.

so.setPromnt(string format): the format specified in the parameter "string format" indicates the format to use to set the prompt displayed as the command prompt at which the user enters commands. In DOS systems, the command prompt typically comprises the path file name followed by the greater than symbol, e.g., "c:\directory>."

so.echo(string text) Displays on the monitor the message indicated in the parameter "string text".

so.type(string file): displays on the monitor the contents of the file indicated in the parameter "string file."

so.runJavaProgram(string classname, string classpath, string args): runs a java program having the class name specified in the parameter "string classname," sets the classpath to the classpath indicated in the parameter "string classpath" containing the members of the class indicated in the parameter "string classname." The arguments specified in the parameter "string args" are passed to the java command "string classname" during execution.

The following methods are called on the ScriptObject to perform an action with respect to the batch file defined by the script object:

so.install( ): method included in install objects 330. This writes the batch file defined by the ScriptObject on which the method is called and, if the ExecuteDuringInstall property is true, runs the batch file defined by the ScriptObject.

so.uninstall( ): method included in uninstall objects 630. This deletes the batch file defined by the ScriptObject on which the method is called and, if the ExecuteDuringUninstall property is true, runs the batch file defined by the ScriptObject before deleting the batch file defined by the ScriptObject.

so.execute(boolean collectoutput): is a method that writes the batch file defined in the ScriptObject to a temporary file and then executes the temporary batch file. The temporary file is deleted after executing. If the parameter boolean collectoutput is set true, then any output from executing the batch file is written to the file "collectoutput."

so.getresult( ): After the method so.execute is called, a call to the method so.getresult( ) will return the file "collectoutput", including the output from executing the temporary batch file.

Figure 3:
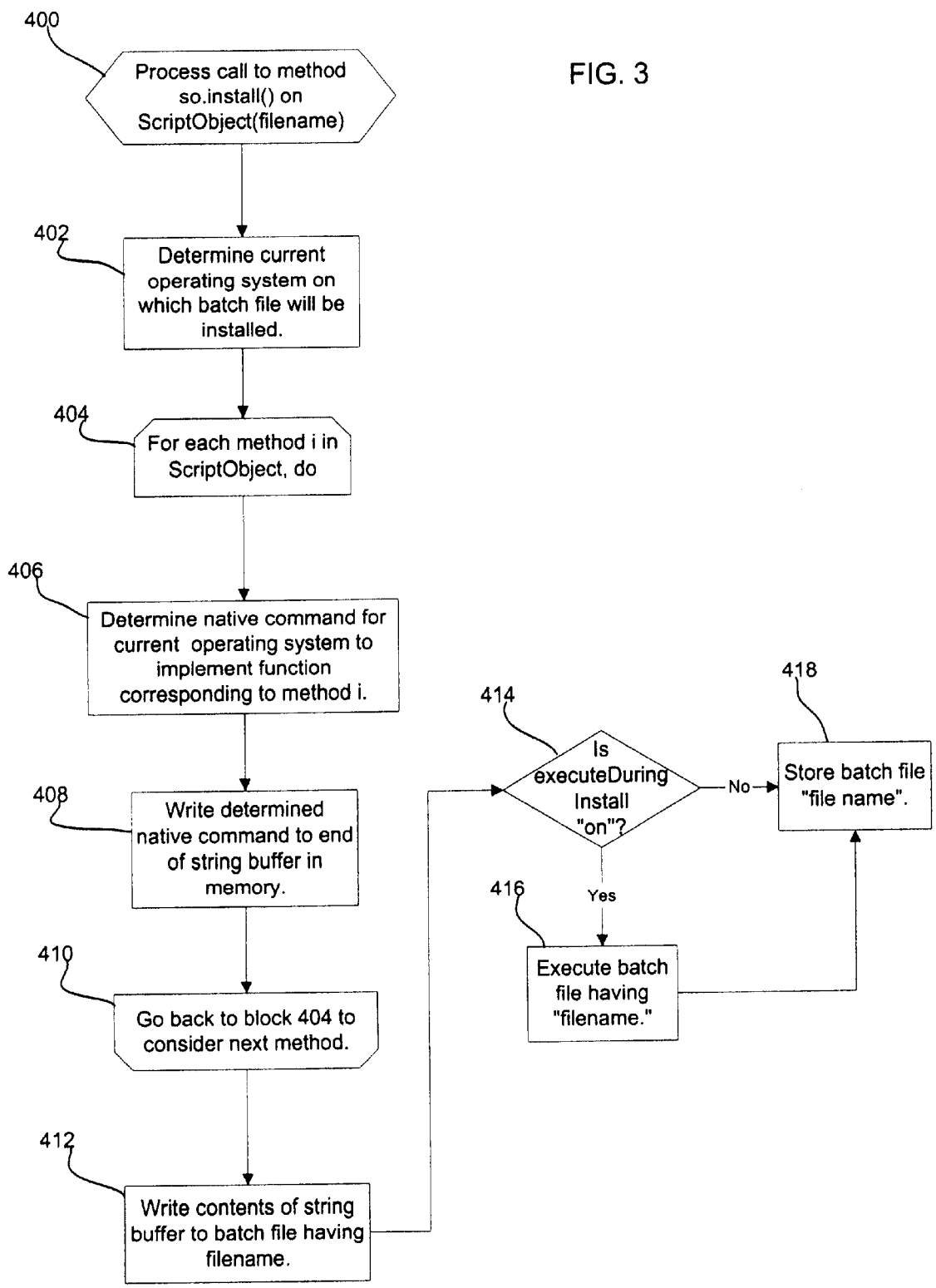
FIG. 3 illustrate logic to generate batch files in accordance with preferred embodiments of the present invention.

FIG. 3 illustrates logic implemented in the install program 17 to process a ScriptObject when the method so.install( ) is called on the ScriptObject during installation. As discussed, the so.uninstall method may be included in the install objects 330. The code to process the method so.uninstall ( ) may be part of the CPP 210 code, which includes code for performing operating system specific operations. The ScriptObject could include any of the properties and actions discussed above, and be called during installation. The methods included in the ScriptObject could be used to set environment variables, run a demonstration program after installation to provide a multi-media presentation explaining the installed product to the user, or configure some aspect of the system as part of the installation. For instance, the ScriptObject could generate a batch file that would execute to build a database table and populate the table for use by the installed program.

Execution of the install( ) method begins at block 400 with the install program 17 processing a call to so.install( ) on a ScriptObject. The install program 17 then accesses the ScriptObject having a file name specified in the "filename" parameter of the subject ScriptObject and determines (at block 402) the current operating system on which the batch file will be installed. At block 404, the install program begins a loop to sequentially process each method/action in the ScriptObject. For each method i, the install program 17 determines (at block 406) the native operating system command to implement the function associated with method i in the current operating system. As discussed, the preferred class of ScriptObjects can be automatically installed on different operating system platforms. At step 406, the install program 17 determines the native operating system command to use in the current instance of generating the batch file. Native operating system commands for each method will be provided for every operating system on which the ScriptObject executes. After determining the native operating system command for the method i, the install program 17 writes (at block 408) the determined native command to the end of a string buffer in the memory 12, which temporarily stores the content of the batch file being created for the current operating system. The install program 17 would proceed (at block 410) back to block 404 to consider any further methods included in the ScriptObject.

After writing out all methods to the string buffer, the install program 17 would write (at block 412) the contents of the string buffer to a batch file having as the file name included in the filename parameter passed with the ScriptObject(filename). The install program then determines (at block 414) whether the ExecuteDuringInstall boolean is true. If not, the install program 17 stores (at block 41) the batch file having the "file name" in a non-volatile storage device. Otherwise, if ExecuteDuringInstall is true, then the install program executes (at block 416) the batch file just created and then proceeds to block 414 to store the batch file.

A call to the method uninstall( ) on ScriptObject(filename) will cause the install program 17 to delete the batch file having the file name specified in the parameter filename passed with the ScriptObject. If the executingDuringUninstall property is "on," then the install program 17 would execute the batch file generated from the ScriptObject before deleting the batch file. In fact, the installation program developer could create a ScriptObject to generate a batch file that when executed during uninstallation reverses actions taken during installation. For instance, if the installation added certain files, tables, and programs to the system, a ScriptObject could include methods, such as so.deleteFile( ) and so.deleteDirectory( ), to delete the files and directories added during installation. Such a ScriptObject would be called only during uninstallation using the uninstall( ) command and have the property ExecuteDuringUninstall set true to execute the ScriptObject during uninstall.

A call to the method execute( ) will perform steps 400 to 412 in FIG. 3, and then execute a temporary copy of the generated batch file maintained in memory 12. After executing the batch file, the code of the execute( ) method would delete the temporary batch file from memory. In this way, the execute( ) method creates only a temporary batch file to include the native operating system commands to execute. Any output results can be returned through a call to the getresult method on the ScriptObject.

Preferred embodiments allow an installation program developer to write batch files using the data objects and methods available in the ScriptObject calls that are platform independent. In this way, the installation program developer need only write a single ScriptObject that will then automatically generate batch files for different operating system platforms. A call to a method to generate a batch file from the ScriptObject will then produce a batch file that has the functions corresponding to the methods in the native operating system commands to allow the batch file to be executed on the current operating system platform.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the ScriptObject class were used to create any file including a sequence of commands for use on different operating systems. Further embodiments, could use the class of the preferred embodiments to create non-batch file programs.

Preferred embodiments described a specific set of methods corresponding to commonly used batch file commands. However, further embodiments may utilize further methods to expand the range of functions that may be included in the file defined by the ScriptObject class.

Preferred embodiments of the install program 17 and ScriptObject class were described as implemented in the Java programming language. However, any other object oriented programming language or other programming language known in the art may be used to implement the components that generate batch files for different operating system.

In summary, preferred embodiments disclose a method, system, and program for generating a file. An object is processed including a plurality of instructions. Each instruction is associated with at least one executable function. A determination is made of an operating system in which the generated file will be executed. For each instruction in the object, a native operating system command is generated that is capable of executing the function associated with the instruction on the determined operating system. Each generated native operating system command is inserted into the file. Execution of the file on the determined operating system will execute the native operating system commands in the file to perform the functions associated with the instructions included in the object.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS and MICROSOFT are registered trademarks of Microsoft Corporation; AIX is a registered trademark of IBM; JAVA is a trademark of Sun Microsystems, Inc.

What is claimed is:

1. A method for generating a file in a computer system, comprising:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system; and inserting each generated native operating system command into the file, wherein execution of the file on the determined operating system will execute the native operating system commands in the file to perform the functions associated with the instructions included in the object.

2. The method of claim 1, further comprising:

processing a property associated with the object indicating whether to execute the file after generating the file;

executing the file after generating the file if the property indicates to execute the file after generating the file; and storing the file in non-volatile memory.

3. The method of claim 1, further comprising:

executing the file and the native operating system commands in the file after generating the file; and deleting the file after executing the file.

4. The method of claim 1, wherein the file is a batch file and wherein the functions associated with the instructions are members of the set of functions consisting of: creating a directory, changing a directory, deleting a directory, renaming a directory, deleting a file, renaming a file, copying a file, moving a file, setting ownership of a batch file, setting permissions of a file, executing an external program, executing commands in another file, setting the path, appending a string to the path, and prepending a string to the path.

5. The method of claim 1, further comprising:

processing a command to uninstall the object;

processing the object to determine the file generated from the instructions in the object; and deleting the determined file.

6. A method for generating a file in a computer system, comprising:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system; and inserting each generated native operating system command into the file, wherein execution of the file on the determined operating system will execute the native operating system commands in the file to perform the functions associated with the instructions included in the object, wherein the file is generated during an installation of a program, and wherein the file includes native operating system commands to configure the computer system for the program being installed;

executing the file to configure the system to support the program being installed; and storing the file in non-volatile memory.

7. A method for generating a file in a computer system, comprising:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system; and inserting each generated native operating system command into the file, wherein execution of the file on the determined operating system will execute the native operating system commands in the file to perform the functions associated with the instructions included in the object, wherein the file is generated during an uninstallation of a program, and wherein the native operating system commands in the file are capable of configuring the computer system to reverse changes to the system resulting from the installation of the program; and executing the file during the uninstallation of the program to execute the native operating system commands therein to configure the computer system to remove files and changes added when the program was installed.

8. The method of claim 7, wherein the execution of the file deletes files adding during the installation of the program.

9. A computer system for generating a file, comprising:

a computer;

an operating system installed on the computer;

a memory accessible to the computer;

means for processing an object including a plurality of instructions, wherein each instruction is associated with at least one executable function;

means for determining the operating system installed on the computer;

means for generating, for each instruction in the object, a native operating system command capable of executing the function associated with the instruction on the determined operating system; and means for inserting each generated native operating system command into the file in the memory, wherein execution of the file on the determined operating system will execute the native operating system commands in the file to perform the functions associated with the instructions included in the object.

10. The computer system of claim 9, further comprising:

a non-volatile memory accessible to the computer;

means for processing a property associated with the object indicating whether to execute the file after generating the file;

means for executing the file after generating the file if the property indicates to execute the file after generating the file; and means for storing the file in the non-volatile memory.

11. The computer system of claim 9, further comprising:

means for executing the file and the native operating system commands in the file after generating the file; and means for deleting the file from the memory after executing the file.

12. The computer system of claim 9, wherein the file is a batch file and wherein the functions associated with the instructions are members of the set of functions consisting of: creating a directory, changing a directory, deleting a directory, renaming a directory, deleting a file, renaming a file, copying a file, moving a file, setting ownership of a batch file, setting permissions of a file, executing an external program, executing commands in another file, setting the path, appending a string to the path, and prepending a string to the path.

13. The computer system of claim 9, further comprising:

means for processing a command to uninstall the object;

means for processing the object to determine the file generated from the instructions in the object; and means for deleting the determined file.

14. A computer system for generating a file, comprising:

a computer;

an operating system installed on the computer;

a memory accessible to the computer;

means for processing an object including a plurality of instructions, wherein each instruction is associated with at least one executable function;

means for determining the operating system installed on the computer;

means for generating, for each instruction in the object, a native operating system command capable of executing the function associated with the instruction on the determined operating system;

means for inserting each generated native operating system command into the file in the memory, wherein execution of the file on the determined operating system will execute the native operating system commands in the file to perform the functions associated with the instructions included in the object, wherein the file is generated during an installation of a program and the file includes native operating system commands to configure the computer system for the program being installed;

a non-volatile memory accessible to the computer;

means for executing the file to configure the system to support the program being installed; and means for storing the file in non-volatile memory.

15. A computer system for generating a file, comprising:

a computer;

an operating system installed on the computer;

a memory accessible to the computer;

means for processing an object including a plurality of instructions, wherein each instruction is associated with at least one executable function;

means for determining the operating system installed on the computer;

means for generating, for each instruction in the object, a native operating system command capable of executing the function associated with the instruction on the determined operating system;

means for inserting each generated native operating system command into the file in the memory, wherein execution of the file on the determined operating system will execute the native operating system commands in the file to perform the functions associated with the instructions included in the object, wherein the file is generated during an uninstallation of a program, wherein the native operating system commands in the file are capable of configuring the computer system to reverse changes to the system resulting from the installation of the program; and means for executing the file during the uninstallation of the program to execute the native operating system commands therein to configure the computer system to remove files and changes added when the program was installed.

16. The computer system of claim 15, wherein the execution of the file deletes files adding during the installation of the program.

17. An article of manufacture for use in generating a file, the article of manufacture comprising computer useable media accessible to a computer, wherein the computer usable media includes at least one computer program that is capable of causing the computer to perform:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system; and inserting each generated native operating system command into the file, wherein execution of the file on the determined operating system will execute the native operating system commands in the file to perform the functions associated with the instructions included in the object.

18. The article of manufacture of claim 17, further comprising:

processing a property associated with the object indicating whether to execute the file after generating the file;

executing the file after generating the file if the property indicates to execute the file after generating the file; and storing the file in non-volatile memory.

19. The article of manufacture of claim 17, further comprising:

executing the file and the native operating system commands in the file after generating the file; and deleting the file after executing the file.

20. The article of manufacture of claim 17, wherein the file is a batch file and wherein the functions associated with the instructions are members of the set of functions consisting of: creating a directory, changing a directory, deleting a directory, renaming a directory, deleting a file, renaming a file, copying a file, moving a file, setting ownership of a batch file, setting permissions of a file, executing an external program, executing commands in another file, setting the path, appending a string to the path, and prepending a string to the path.

21. The article of manufacture of claim 17, further comprising:

processing a command to uninstall the object;

processing the object to determine the file generated from the instructions in the object; and deleting the determined file.

22. An article of manufacture for use in generating a file, the article of manufacture comprising computer useable media accessible to a computer, wherein the computer usable media includes at least one computer program that is capable of causing the computer to perform:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system;

inserting each generated native operating system command into the file, wherein execution of the file on the determined operating system will execute the native operating system commands in the file to perform the functions associated with the instructions included in the object, wherein the file is generated during an installation of a program, and wherein the file includes native operating system commands to configure the computer system for the program being installed;

executing the file to configure the system to support the program being installed; and storing the file in non-volatile memory.

23. An article of manufacture for use in generating a file, the article of manufacture comprising computer useable media accessible to a computer, wherein the computer usable media includes at least one computer program that is capable of causing the computer to perform:

processing an object including a plurality of instructions, wherein each instruction is associated with at least one executable function;

determining an operating system in which the generated file will be executed;

generating, for each instruction in the object, a native operating system command capable of executing the function associated with the instruction on the determined operating system;

inserting each generated native operating system command into the file, wherein execution of the file on the determined operating system will execute the native operating system commands in the file to perform the functions associated with the instructions included in the object, wherein the file is generated during an uninstallation of a program, and wherein the native operating system commands in the file are capable of configuring the computer system to reverse changes to the system resulting from the installation of the program; and executing the file during the uninstallation of the program to execute the native operating system commands therein to configure the computer system to remove files and changes added when the program was installed.

24. The article of manufacture of claim 23, wherein the execution of the file deletes files adding during the installation of the program.

25. An article of manufacture for use in generating a file, the article of manufacture comprising computer useable media accessible to a computer, wherein the computer usable media includes:

a first command to create an object;

a plurality of instructions to include in the object, wherein each instruction is associated with at least one executable function, wherein at least one of the plurality of instructions is included in the object; and a second command to process each instruction in the object to generate, for each instruction, a native operating system command into the file to execute the function associated with the instruction on one of a plurality of operating systems, wherein the file is processed to execute the native operating system commands therein to perform the functions associated with the instructions included in the object.

26. The article of manufacture of claim 25, further comprising:

a property associated with the object indicating whether to execute the file after generating the file, wherein execution of the second command stores the file in non-volatile memory and executes the file after generating the file if the property indicates to execute the file after generating the file.

27. The article of manufacture of claim 25, wherein the second command executes the file and the native operating system commands in the file after generating the file and deletes the file after executing native operating system commands in the file.

28. The article of manufacture of claim 25, wherein the plurality of instructions are members of the set of functions consisting of: creating a directory, changing a directory, deleting a directory, renaming a directory, deleting a file, renaming a file, copying a file, moving a file, setting ownership of a batch file, setting permissions of a file, executing an external program, executing commands in another file, setting the path, appending a string to the path, and prepending a string to the path.

29. The article of manufacture of claim 25, wherein the second command processes the object to determine the file generated from the instructions in the object and deletes the determined file.

30. An article of manufacture for use in generating a file, the article of manufacture comprising computer useable media accessible to a computer, wherein the computer usable media includes:

a first command to create an object;

a plurality of instructions to include in the object, wherein each instruction is associated with at least one executable function, wherein at least one of the plurality of instructions is included in the object; and a second command to process each instruction in the object to generate, for each instruction, a native operating system command into the file to execute the function associated with the instruction on one of a plurality of operating systems, wherein the file is processed to execute the native operating system commands therein to perform the functions associated with the instructions included in the object, wherein the second command generates the file from the object during an installation of a program, wherein the generated file includes native operating system commands to configure the computer system for the program being installed, and wherein the generated file is executed to configure the system to support the program being installed and stored in non-volatile memory.

31. An article of manufacture for use in generating a file, the article of manufacture comprising computer useable media accessible to a computer, wherein the computer usable media includes:

a first command to create an object;

a plurality of instructions to include in the object, wherein each instruction is associated with at least one executable function, wherein at least one of the plurality of instructions is included in the object; and a second command to process each instruction in the object to generate, for each instruction, a native operating system command into the file to execute the function associated with the instruction on one of a plurality of operating systems, wherein the file is processed to execute the native operating system commands therein to perform the functions associated with the instructions included in the object, wherein the second command generates the file during an uninstallation of a program, wherein the native operating system commands in the file are capable of configuring the computer system to reverse changes to the system resulting from the installation of the program, and wherein the file and native operating system commands therein are executed during the uninstallation of the program to configure the computer system to remove files and changes added when the program was installed.

32. An article of manufacture for use in generating a file, the article of manufacture comprising computer useable media accessible to a computer, wherein the computer usable media includes at least one computer program that is capable of causing the computer to perform:

processing commands in an object that define a sequence of operations; and generating from the commands in the object the file including corresponding native operating system commands for a given operating system that is one of a plurality of operating systems, wherein the generated native operating system commands perform the sequence of operations on the given operating system.

33. A method for generating a file, comprising:

defining commands in an object that define a sequence of operations; and generating from the commands in the object the file including corresponding native operating system commands for a given operating system that is one of a plurality of operating systems, wherein the generated native operating system commands perform the sequence of operations on the given operating system.

* * * * *